A. W. SPRAGUE & J. M. OSGOOD.
Draft Regulators for Stoves and Furnaces.

No. 137,632. Patented April 8, 1873.

WITNESSES
Alfred W. Sprague
James M. Osgood
INVENTORS

By their Att'ys
Henry W. Williams & Co.

UNITED STATES PATENT OFFICE.

ALFRED W. SPRAGUE, OF QUINCY, AND JAMES M. OSGOOD, OF SOMERVILLE, MASSACHUSETTS; SAID OSGOOD ASSIGNS TO SAID SPRAGUE.

IMPROVEMENT IN AUTOMATIC DRAFT-REGULATORS FOR STOVES AND FURNACES.

Specification forming part of Letters Patent No. 137,632, dated April 8, 1873; application filed August 16, 1872.

*To all whom it may concern:*

Be it known that we, ALFRED W. SPRAGUE, of Quincy, in the county of Norfolk and State of Massachusetts, and JAMES M. OSGOOD, of Somerville, in the county of Middlesex and State of Massachusetts, have invented a new and Improved Regulator, said regulator being for the purpose of controlling, by automatic action, the draft of stoves, furnaces, ventilators, &c., so that a uniform heat of any given degree can be maintained, whether of a higher or lower temperature.

The object of our invention is to retain a perfectly uniform temperature at any given height or degree in any inclosed or nearly inclosed space, and under any condition in such space where uniformity of temperature is desirable—as, for example, in ovens of cooking-stoves, hot-air chambers of furnaces, apartments of dwelling-houses, halls, school-rooms, churches, refrigerating houses and chests, ventilators of rooms, &c. We effect this result by means of the expansive force of confined air, vapor, or gas, which is arranged so as to act upon a column or mass of mercury or any other fluid, directly or indirectly, the said mercury being confined or deposited in a circular, semicircular, or curved space, within and generally near the outer edge of a wheel fixed to the axle of a damper or valve so as to push the mass of mercury forward, changing the center of gravity of the wheel, and, therefore, causing it to rotate sufficiently to turn the damper or valve. By means of an adjustable weight upon a graduated arm, the damper may be closed at any temperature indicated by the scale upon the said arm.

Figure 1:
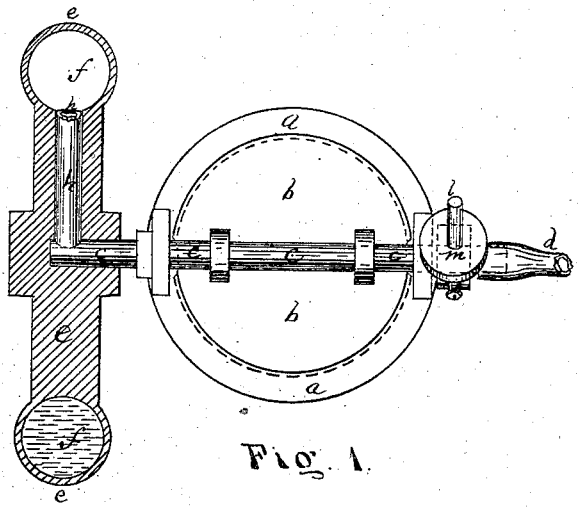
Figure 2:
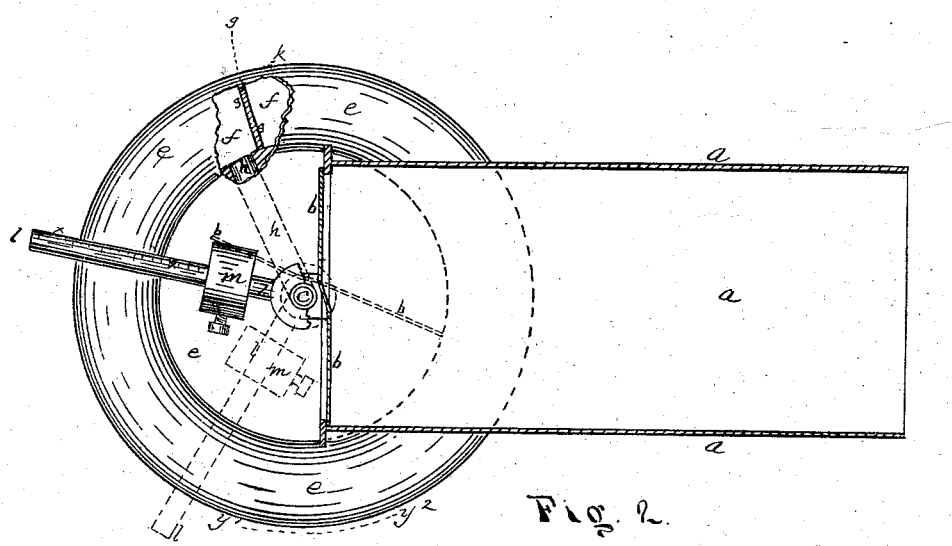

In the accompanying drawing, Figure 1 is a front elevation of our regulator, showing the wheel in section. Fig. 2 is a longitudinal section through the pipe, with broken lines showing the different positions of the damper and arm, and with a portion broken out of the wheel to show the partition across the space inside the same.

Similar letters of reference indicate corresponding parts.

$a$ represents a draft-pipe. $b$ is the damper or valve. $c$ is a hollow or tubular axle. $d$ is a tube leading to the hollow axle $c$ and connecting at its other end, directly or indirectly, with the air, gas, or vapor, in the inclosed space which is required to be at a uniform temperature. $e$ is a wheel fixed upon the axle $c$. $f$ is a space extending nearly around the wheel $e$ near its circumference. $g$ is a partition across the space $f$. $h$ is a space or passage connecting the space $f$, at the under side of the partition $g$, with the hollow axle $c$. $k$ is an aperture allowing the air to enter the space $f$, above the partition $g$, when the valve $b$ is opening, and to pass out when it is closing. $l$ is an arm or lever fixed to the axle $c$. $x$ is a graduated scale upon the arm $l$. $m$ is a weight sliding upon the said arm $l$, and fixed at any desired point by any common and well-known contrivance.

In practical operation—as, for example, in a common furnace such as is commonly used in dwelling-houses—our device works as follows: As the heat from the fuel increases, the hot air in the hot-air chamber expands and enters, directly or indirectly, the tube $d$, passes through the tubular axle $c$, through the passage $h$, into the space $f$, (below the partition $g$,) and presses the mercury—extending, say, from $y^1$ to $y^2$—forward, the air passing out before it at the aperture $k$. Instantly the center of gravity of the wheel $e$ is changed it begins to rotate, and the valve $b$ closes, shutting off the draft to the fuel. As soon as the temperature of the hot-air box begins to lower, the weight $m$ and the mercury, attempting to resume their normal position, open the valve $b$, and thus supply air again to the burning fuel. Other forms involving this same principle might be mentioned, as that of a straight or slightly-bent tube so balanced upon the damper-axle as to turn it as the fluid is pushed forward to the opposite end.

Some of the advantages of this invention are the saving of fuel; the prevention of the escape of poisonous gases into the hot-air chamber, as the smoke-pipe may be left open unobstructed by dampers.

As an advantage over other devices intended to produce the same result, may be mentioned principally its cheapness, and, also, the exactness and sureness with which it accomplishes its work.

As mentioned above, this invention may be applied to any inclosed space where uniformity of temperature is required.

Having thus fully described our invention, what we claim, and desire to secure by Letters Patent, is—

1. A wheel or portion of a wheel chambered in such a manner as to contain a column or mass of mercury or other fluid, or any substance acting as a fluid, and so connected with the damper or valve of a heating apparatus that the expansive force of air or gas, displacing the fluid, may cause the said wheel to turn, thus opening or closing, as the case may be, the said damper or valve.

2. The combination and arrangement of the space $f$, partition $g$, passage $h$, and hollow axle $c$, substantially as and for the purposes hereinbefore specified.

3. The arrangement of the hollow axle $c$ with the arm $l$ and weight $m$, as combined with the wheel $e$ and its internal arrangement, substantially as and for the purpose above set forth.

ALFRED W. SPRAGUE.
JAMES M. OSGOOD.

Witnesses:
HENRY W. WILLIAMS,
E. H. OBER.